2 Sheets—Sheet 2.
J. ELLIS.
Thrashing Machine.
No. 230,536. Patented July 27, 1880.
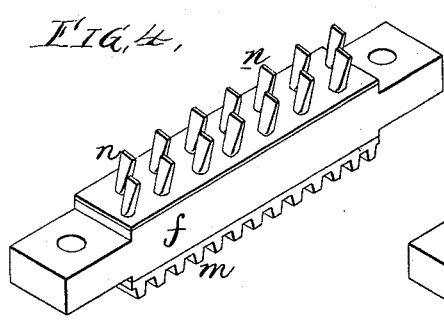
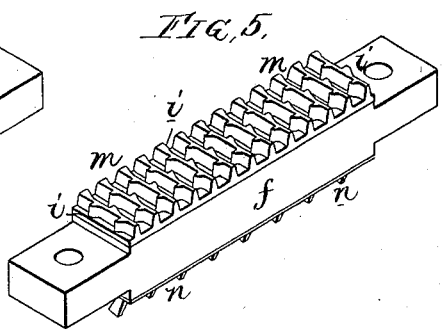
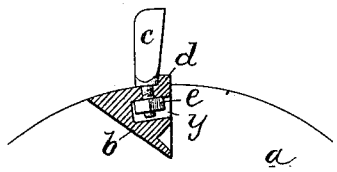
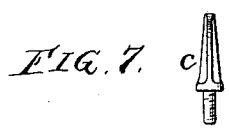
Witnesses
J. W. Dumer.
Harry Smith
Inventor
John Ellis
by his Attorneys
Howson & Son

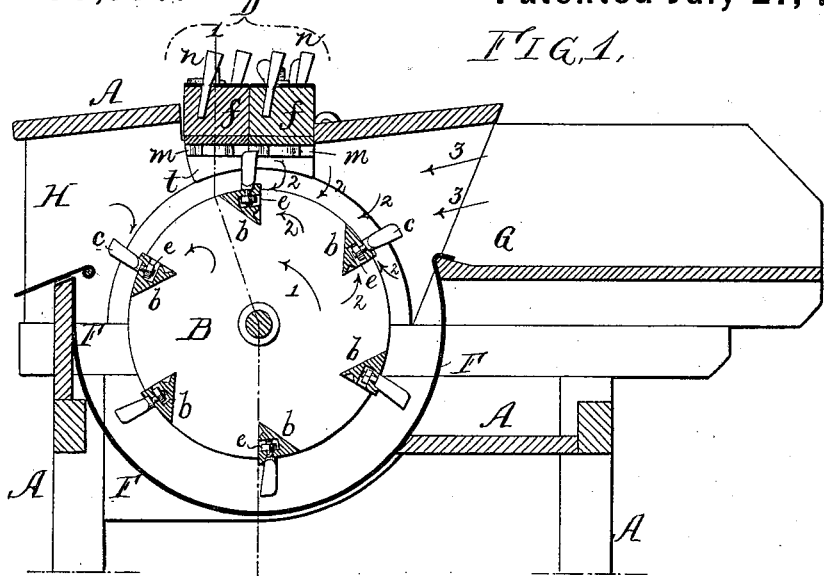
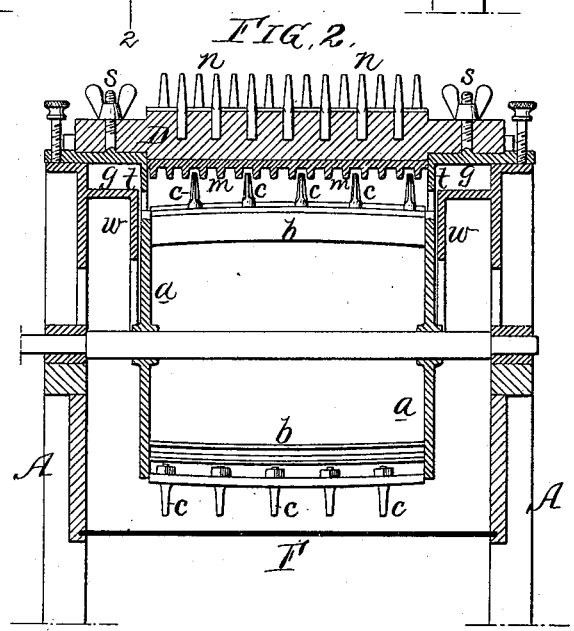
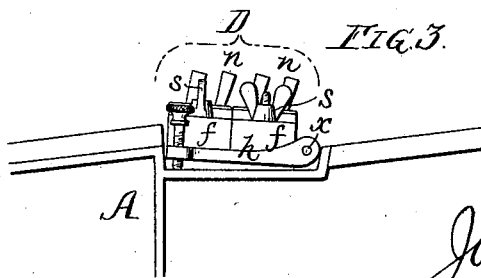

UNITED STATES PATENT OFFICE.

JOHN ELLIS, OF POTTSTOWN, PENNSYLVANIA, ASSIGNOR TO THE ELLIS KEYSTONE AGRICULTURAL WORKS, OF SAME PLACE.

THRASHING-MACHINE.

SPECIFICATION forming part of Letters Patent No. 230,536, dated July 27, 1880.

Application filed September 20, 1879.

*To all whom it may concern:*

Be it known that I, JOHN ELLIS, a citizen of the United States, residing in Pottstown, Montgomery county, Pennsylvania, have invented certain Improvements in Thrashing-Machines, of which the following is a specification.

My invention relates to improvements in the cylinder and concave of a thrashing-machine, the object of my improvements being to prevent the throwing out of dust and fine particles into the face of the attendant who feeds the machine, and to prevent accident to the teeth of the cylinder or concave by the introduction of hard substances into the machine. These objects I attain in the manner which I will now proceed to describe, reference being had to the accompanying drawings, in which—

Figure 1, Sheet 1, is a longitudinal section of so much of a thrashing-machine as illustrates my invention; Fig. 2, a transverse section of the same on the line 1 2; Fig. 3, a side view of part of Fig. 1; Fig. 4, Sheet 2, a perspective view of one of the bars of the concave; Fig. 5, a perspective view of the same bar inverted; Fig. 6, an enlarged sectional view of one of the toothed bars of the cylinder, and Fig. 7 a front view of one of the teeth.

A represents part of the frame of the machine; B, the cylinder; D, the concave; F, the casing surrounding the cylinder; G, the feed-table, and H the delivery-opening.

The cylinder consists, as usual, of circular end plates, $a$, and transverse bars $b$, carrying teeth $c$. The bars $b$, however, are peculiarly constructed, being arched in the direction of their length, as shown in Fig. 2, and being much wider at the rear than at the front ends, which are comparatively sharp, as shown in Figs. 1 and 6.

By arching the bars their strength is materially increased, so that they will not be bent inward by the pressure to which they are subjected, such bending being a serious objection to ordinary straight bars.

The object of making the bars of the triangular transverse section shown is to cause the formation of eddying currents of air behind each bar as the cylinder is rapidly rotated. Thus on the rotation of the cylinder in the direction of the arrow 1, Fig. 1, currents in the direction of the arrows 2 will be formed, and these currents will induce a strong draft in the direction of the arrows 3 through the feed-opening, thereby preventing the throwing out of dirt and the forcible projection of small particles into the face of the attendant who feeds the machine.

On the top of each bar $b$, at the rear edge of the same, is a rib, $d$, against which bear the teeth $c$, the hold of the latter on the bar being thereby strengthened.

The teeth have stems fitting freely in openings in the bar, and are secured by nuts $e$, which are contained within a narrow slot, $y$, formed in the rear edge of the bar. This slot is of such a character that the distance between the end of the stem and the bottom of the slot is less than the thickness of the nut, so that even if the latter should become loose it cannot escape from the slot.

The casing F extends up beyond the center of the cylinder B, the object of this arrangement being to contract the area of the feed and delivery openings, and thus aid the bars $b$ in performing the work for which their peculiar shape adapts them, the contraction of the feed-opening increasing the force of the draft in the direction of the arrows 3, while the contraction of the discharge-opening prevents the back draft at the lower part of the cylinder from inducing grain or particles of chaff to enter the casing.

Each tooth $c$ has the shape shown in Figs. 6 and 7—that is to say, the rear edge of the tooth tapers gradually from bottom to top and the front edge is reduced to a uniform width from top to bottom. A tooth of this shape is not so liable to become clogged as a tooth of uniform width from front to rear, as the former will cut its way through tough and comparatively unyielding straw.

The concave D consists of two bars, $ff$, secured at each end to metal plates $g$, the latter being provided with or forming part of arms $h$, pivoted at $x$, Fig. 3, to lugs on the frame of the machine. The outer end of each arm $h$ is provided with a thumb-screw, by operating which the concave may be raised or lowered.

One face of each bar $f$ is armed with small ribs m, Fig. 5, and the opposite face with long teeth n, Fig. 4, the latter teeth being inclined in respect to the face from which they project so that by properly adjusting the bar the teeth may have the desired inclination.

In order to insure the proper and effective action of the ribs m upon the grain as it is fed through the machine, said ribs are made with laterally-projecting spurs i, the spurs on the side of one rib coinciding with the spaces between the spurs on the adjoining rib, as shown in Fig. 5.

Each of the bars f is secured to the plate g by means of a thumb-screw, s, so that said bars can be readily reversed. Owing to its adjustability and reversibility of the bars f and to the character of the teeth carried thereby, the concave can be readily adapted for efficient action upon any kind of grain.

Projecting downward from the plates g are flanges t, which, in connection with the guard-frames w at the ends of the cylinder, prevent the lateral escape of grain or stalks while the machine is in operation.

Injury to the teeth of the cylinder or concave in the event of any hard substance being introduced into the machine with the grain is prevented by pivoting the concave to the frame at x and allowing it to be entirely free from the frame at the acting end, so that it is free to rise when such hard substance is brought into contact with it. The concave, instead of having two bars, f, might have one bar only, or more than two bars. The latter number, however, is preferred.

I am aware that a casing carried up beyond the center of the cylinder is not new in itself, and therefore I do not broadly claim such a casing; but by combining a casing of this class with a cylinder having bars of the peculiar character shown and described a new result is attained, as above set forth.

Concaves pivoted to the frame at one end have been heretofore employed; but all such concaves have been connected to the frame at the opposite end by means of adjusting devices, so that they are not free to rise when foreign matters too hard to be crushed are introduced between the cylinder and concave.

I claim as my invention—

1. A thrashing-machine in which a cylinder the bars of which are thickened gradually from front to rear, so as to present sharp front edges and wide rear edges, is combined with a frame and casing constructed, as described, so as to present a contracted feed-opening, whereby eddying currents are produced, as set forth.

2. The combination, in a thrashing-machine, of a cylinder having bars sharp in front and wide in the rear, so as to form eddying currents, with a casing extending above the center of the cylinder at front and rear, whereby the inlet and discharge openings are contracted, as and for the purpose set forth.

3. The combination of the teeth c with a bar, b, having a rib, d, as specified.

4. The combination of the frame and cylinder of the machine with a concave pivoted to the frame at one end, but entirely disconnected from said frame at the opposite end, whereby it is free to turn on its pivots and be thrown up when undue pressure is exerted upon it, as set forth.

In testimony whereof I have signed my name to this specification in the presence of two subscribing witnesses.

JOHN ELLIS.

Witnesses:
A. K. SHANER,
CHS. RUTTER.